United States Patent [19]

Fujiwara et al.

[11] Patent Number: 4,860,782

[45] Date of Patent: Aug. 29, 1989

[54] REDUCING VALVE EQUIPPED WITH A VAPOR-LIQUID SEPARATOR

[75] Inventors: Katsuji Fujiwara; Hideaki Yumoto, both of Hyogo, Japan

[73] Assignee: TLV Co., Ltd., Tokyo, Japan

[21] Appl. No.: 319,417

[22] Filed: Mar. 3, 1989

Related U.S. Application Data

[63] Continuation-in-part of Ser. No. 250,969, Sep. 23, 1988, abandoned, which is a continuation of Ser. No. 85,252, Aug. 11, 1987, abandoned, which is a continuation of Ser. No. 11,380, Feb. 5, 1987, abandoned, which is a continuation of Ser. No. 660,720, Oct. 15, 1984, abandoned.

[30] Foreign Application Priority Data

| Oct. 27, 1983 [JP] | Japan | 58-167151 |
| Feb. 15, 1984 [JP] | Japan | 59-26527 |
| Mar. 19, 1984 [JP] | Japan | 59-39905 |
| Jun. 28, 1984 [JP] | Japan | 59-97855 |

[51] Int. Cl.$^4$ ............................................. F16T 1/20
[52] U.S. Cl. ................................. 137/193; 137/489; 137/433
[58] Field of Search ............... 137/192, 195, 193, 194, 137/203, 204, 505.42, 505.39, 489, 409, 433

[56] References Cited

U.S. PATENT DOCUMENTS

| 1,334,079 | 3/1920 | Callicott | 137/193 |
| 2,357,097 | 8/1944 | Funtan | 137/204 |
| 2,726,732 | 12/1955 | Faust | 137/195 X |
| 2,876,793 | 3/1959 | Vanderpoel | 137/505.42 |
| 2,988,102 | 6/1961 | Harry | 137/204 |
| 3,348,564 | 10/1967 | Sochting | 137/193 |
| 3,418,789 | 12/1968 | Hoffman | 137/195 X |

FOREIGN PATENT DOCUMENTS

| 939386 | 10/1963 | United Kingdom . |
| 1502917 | 3/1978 | United Kingdom . |
| 1567545 | 5/1980 | United Kingdom . |

*Primary Examiner*—Alan Cohan
*Attorney, Agent, or Firm*—Toren, McGeady & Associates

[57] ABSTRACT

In a reducing valve assembly including a vapor-liquid separator, a valve casing, having therein a valve mechanism defining a valve orifice and defining inlet and outlet openings having the reducing valve mechanism interposed therebetween, is arranged with the valve casing extended below the reducing valve to define a sump chamber, the extended portion of the casing extending from a part thereof which surrounds the valve orifice. An annular partition is provided at the upper part of the sump chamber to form an annular space between the partition and the extended portion of the valve casing, the annular space being arranged to communicate with the inlet opening from above and with the sump chamber from below. Further, the annular partition is configured to define a central passage in flow communication between the sump chamber and a space below the valve orifice and a rotation deflector is arranged within the annular space and a drain valve or steam trap is arranged in the sump chamber to discharge liquid accumulated therein.

5 Claims, 4 Drawing Sheets

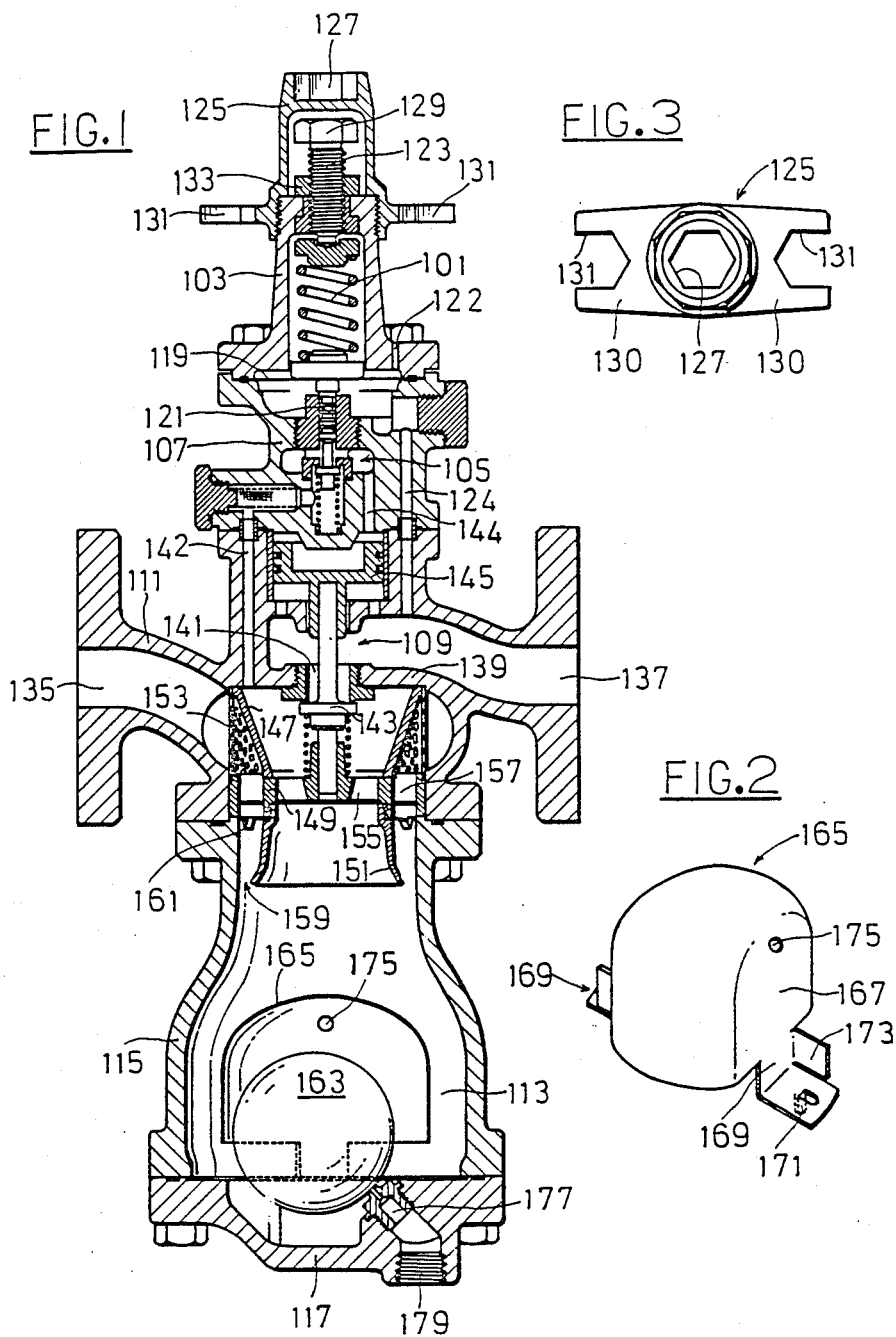

4,860,782

REDUCING VALVE EQUIPPED WITH A VAPOR-LIQUID SEPARATOR

CROSS REFERENCE TO RELATED APPLICATIONS

This is a continuation-in-part application of Ser. No. 07/250,969 filed Sept. 23, 1988 which is a continuation of Ser. No. 085,252* filed Aug. 11, 1987 which, in turn, was a continuation of Ser. No. 011,380* filed Feb. 5, 1987 which was a continuation of Ser. No. 60,720* filed Oct. 15, 1984, * all abandoned.

FIELD AND BACKGROUND OF THE INVENTION

The present invention relates generally to valve devices and more specifically to a reducing valve assembly for steam and compressed air or gases, especially to a construction of a reducing valve which is equipped with a vapor-liquid separator.

In boilers or compressors, steam or gas under pressure is reduced to a desired pressure by means of a reducing valve before reaching the equipment which utilizes the steam or the compressed air. Steam or air usually contains condensed water and solid matter. Since water particles and foreign matter can cause wear or corrosion in the valve mechanisms, for example, in the valve seat or other sliding components thereof, reducing valve mechanisms will often malfunction and pressure may build up in the downstream system due to leakage of steam or air eventually exceeding the preset value. Such water particles and foreign matter which have passed the reducing valve may also cause damage or decreased efficiency of the equipment utilizing the steam or air.

In prior art technology, in order to eliminate condensate and foreign matter, a vapor-liquid separator and a strainer have been fitted upstream of the reducing valve in sequence. Each provides flanges to be fitted to the piping of the assembly and the vapor-liquid separator is so constructed that water particles and foreign matter are separated by causing steam or air to impinge on a barrier provided in the separating chamber. A drain valve and a strainer therefor are fitted to the separator. The strainer is placed between the separator and the reducing valve and is fitted with a blow-down valve.

Prior art mechanisms of this type described result in the requirement for long piping and large installation space. Additionally, since the vapor-liquid separator may display a poor separating characteristic, a finer and consequently larger strainer may be required to be installed downstream. Further additional valves and components may be required, thereby resulting in complex piping and higher installation costs.

Accordingly, the present invention is intended to provide a reducing valve assembly which includes a vapor-liquid separator wherein many of the prior art problems are overcome. In accordance with the present invention, a vapor-liquid separator may be incorporated in the reducing valve assembly and a strainer may, if required, also be incorporated because the need for a large filter is eliminated. The invention seeks to provide a reducing valve assembly which is only slightly larger in size than an ordinary reducing valve because of the provision of a sump.

SUMMARY OF THE INVENTION

Briefly, the present invention may be described as a reducing valve assembly including vapor-liquid separator means comprising: a valve casing having contained therein reducing valve means comprising a valve orifice; inlet and outlet means having said reducing valve means operatively interposed therebetween; a sump chamber defined below the valve orifice by an extended portion of the valve casing below the reducing valve means, said extended portion extending from a part of the valve casing surrounding the orifice; an annular partition at the upper part of the sump chamber forming an annular space between the partition and the extended portion of the valve casing; said annular space being arranged to communicate with the inlet means from above and with the sump chamber from below; the annular partition being configured to define a central passage in flow communication between the sump chamber and the space below the valve orifice; rotation deflector means arranged in the annular space; and drain valve means arranged in the sump chamber to discharge liquid accumulated therein, the drain valve means comprising, for example, steam trap means.

The various features of novelty which characterize the invention are pointed out with particularity in the claims annexed to and forming a part of this disclosure. For a better understanding of the invention, its operating advantages and specific objects attained by its use, reference should be had to the drawings and descriptive mater in which there is illustrated and described the preferred embodiments of the invention.

DESCRIPTION OF THE DRAWINGS

In the drawings:

FIG. 1 is a sectional view showing a reducing valve assembly including liquid-vapor separator means in accordance with the invention;

FIG. 2 is a perspective view of a float cover shown in the assembly of FIG. 1;

FIG. 3 is a plan view of a protective cover shown for the assembly of FIG. 1;

DETAILED DESCRIPTION OF THE PREFERRED EMBODIMENTS

Figure 6:
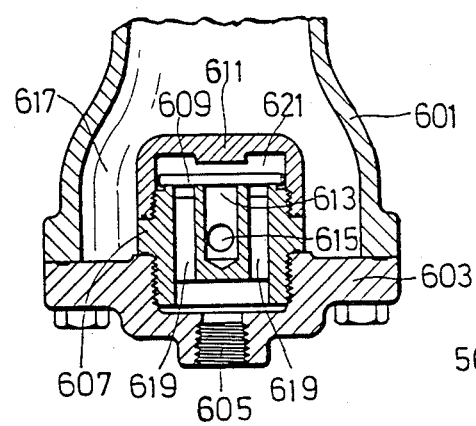
FIG. 6 is a sectional view of an arrangement of a disc-type steam trap operative to serve as the drain valve.

Referring now to the drawings and particularly to FIGS. 1, 2 and 3, wherein similar reference numerals are used to identify similar parts therein, there is shown a reducing valve assembly having a casing which is composed of a spring casing 103 within which there is contained a pressure set spring 101. The casing of the assembly also includes a valve casing portion 107 within which a pilot valve 105 is arranged. The valve assembly also includes a portion 111 of the casing defining an inlet 135, with the casing also defining an outlet 137 on the opposite side thereof with a main valve assembly 109 being interposed operatively between the inlet 135 and the outlet 137.

Additionally, the casing of the overall assembly is formed to define a sump body 115 within which there is enclosed a sump 113 with a bottom cover 117 being attached to the bottom of the sump casing or body 115.

The reducing valve assembly of the invention includes a diaphragm 119 which is formed of a thin metallic plate and which is arranged between the spring casing 103 and the valve casing 107. The upper surface of the diaphragm 119 is in contact with the lower end of the pressure set spring 01 and the lower surface of the diaphragm contacts the top of a pilot valve spindle 121. The space above the diaphragm 119 communicates with the atmosphere through a passage 122 and the space therebelow communicates with the outlet 137 through a passage 124.

An adjusting screw 123 is provided at the upper part of the casing of the valve assembly above the spring casing 103. The lower end of the adjusting screw 123 contacts the top of the pressure set spring 101. The portion of the adjusting screw 123 protruding above the spring casing 103 is covered with a protective cap 125 which is fitted so as to be freely detachable and which is constructed, as best seen in FIG. 3, to simultaneously operate as a wrench.

The cap 125 is formed with a hexagonal socket 127 located at the top of the cap or cover 125 which may be used to rotate the adjusting screw 123 by turning the protective cover 125 upside down and applying the socket 127 to the hexagonal head 129 of the adjusting screw 123. The cover 125 is also formed with radial projections 130, each of which defines a recess 131 which may be applied to rotate lock nuts 133 which engage the adjusting screw 123 to lock it in place.

The casing portion 111 defines the inlet 135 and the outlet 137 which are separated by a horizontal bridge wall 139 and which communicate with each other through a valve orifice 141 provided in the bridge wall 139. A valve body 143 is located downside of the valve orifice 141 and is connected with a piston 145 by a valve spindle passing through the valve orifice 141.

The pilot valve 105 is situated between a passage 142 communicating with the chamber below the valve orifice 141 and a passage 144 communicating with the chamber above the piston 145. The space above the piston 145 communicates with a space below the diaphragm 119 through a labyrinth provided on the pilot valve spindle 121.

In the space below the valve orifice 141, a conical wall member 147, a circular retaining plate 149 and a cylindrical swisher member 151, which is divergent downwardly, are provided. Outside the conical wall member 147, a perforated cylindrical screen 153 is arranged. A swelling-out chamber is formed outside the screen 153 which communicates with the inlet 135.

The conical wall member 147 and the screen 153 contact the horizontal bridge wall 139 at the topes thereof and retaining plate 149 at their bottoms. The lower circumference of the retaining plate 149 contacts the top of the case body 115 and is fixed at its position. The swisher member 151 is screwed in the retaining plate 149. The retaining plate 149 is provided with passages 155 and 157 at the center and outer circumference thereof, respectively. In this manner, the space below the valve orifice 141 is separated by a partition composed of the conical wall member 147, retaining plate 149 and swisher member 151, forming an annular space 159 outside the partition member or assembly 147, 149, 151.

A rotation deflector 161 is arranged in the annular space 159 and is placed between the retaining plate 149 and the swisher member 151.

The rotation deflector 161 comprises a thin ring having a series of radial projections which are slanted in the same direction and which are arranged in a circle.

The body of the sump case 115 has a larger diameter at the bottom than at the top and the diameter gradually expands at the central portion. In the sum chamber, a float 163 and a float cover 165 are provided, with the float 163 being shaped as a hollow sphere made of thin plate. The float cover 165 is shaped as an inverted cup having a planar portion 167 (FIG. 2) facing the viewer, a seen in the drawing. The float cover 165 operates to guide the float 163 so as to displace it in a plane parallel to the plane of the drawing, as seen in FIG. 1.

The float cover 165 includes legs 169 which extend downwardly from the planar portion 167 and at the opposite side thereof. The float cover 165 is fixed by placing the ends of the legs between the sump case body 115 and the bottom cover 117. At this time, a strip 171 which is provided at the leg 169 is inserted into a hole which is drilled in the bottom cover 117 to determine the angular position of the float cover 165.

The legs 169 of the float cover 165 are provided with an extended baffle plate 173 in order to restrict the rotational motion of liquid accumulated in the sump 113. The baffle plates 173 operating to restrict the rotation of liquid are preferably arranged so as not to interfere with the rotational motion of vapor or gas at the upper portion of the sump. The float cover 165 is provided with a vent hole 175 at its upper section. The purpose of the vent hole is to allow gas to be vented therethrough when liquid enters the float cover 165 because the liquid inlet is arranged downwardly to prevent the float 163 from being disturbed by the turbulent motion of steam or gas.

The bottom cover 117 is provided with a drain valve orifice 177 which is opened by the float 163 to automatically discharge liquid accumulated in the sump 113 to a drain 179.

The float 163, being confined on opposite sides by the planar portions 167 of float cover 165, can pivot from its orifice closing position shown in FIG. 1, to a position above and away from the obliquely extending orifice 177. This opens the orifice 177 while at the same time maintaining the position of float 163 so that it can reengage and close the orifice 177 when the liquid level falls.

Figure 8:
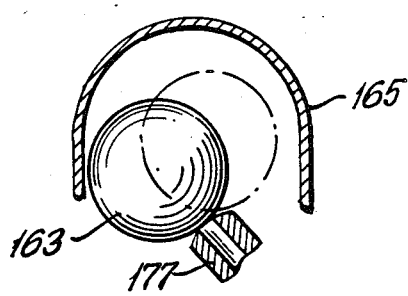
FIG. 8 is a schematic side elevational view in the area of the drain valve showing how the float pivots from a closed position to an open position within a float cover.
Figure 9:
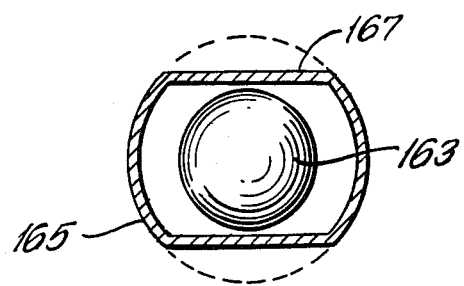
FIG. 9 is a top view of FIG. 8, partly in section.

The planar side portions 167 of float cover 165 thus cooperate with the oblique positioning of drain orifice 177 to open and close the orifice (see FIGS. 8 and 9).

This has a functional advantage in that the orifice can be made with a relatively large diameter resulting in a larger condensate discharge capacity. In other words, a smaller float can be used for a given orifice diameter or discharge capacity. The drain orifice is also arranged obliquely under the float to permit rotation of the float, using the drain orifice as a fulcrum. This rotation, however, is only possible if a float cover that is large enough is provided. A large float cover would permit movement of the float into an undesirable position, however, for example, to the side of the orifice. This would not insure that the float closes the orifice when the liquid level falls. The larger float cover is thus provided with flat planar portions on opposite sides of the float to confine the movement of the float. The planar portions also reduce the tendency of fluid to rotate within the larger float cover, that would also have adverse effects on the positive positioning of the float in the open and closed position of the sump valve. The presence of the planar portions reduces the kinetic energy of the fluid within the cover.

In the operation of the mechanism in accordance with the present invention, the function of pressure reduction is accomplished in a manner which is conventional and within the knowledge of those skilled in the art. The reducing valve of the invention operates as an ordinary reducing valve and, if the pressure at the outlet 137 is lower than the set value, the valve orifice 141 will be opened. Thus, if the pressure downstream of the reducing valve is lower than the preset value, the diaphragm 119 will detect this and it will actuate the valve body to open the orifice 141. As a result, steam or compressed air will flow from the inlet 135 to the outlet 137 through the valve orifice 141. Steam or air is imparted rotational motion by the deflector 161 while passing through the annular space 159. Rotating matter is subjected to centrifugal force and condensate and solid matter, because of the fact that the mass thereof is greater than that of a gas, will be driven radially outwardly of the rotational gas flow and will reach the surrounding wall of the sump and will flow downwardly along the wall. The central part of the rotational gas will flow upwardly to the valve orifice 141 and then to the outlet 137.

The rotational deflector 161 is a small annular component which is capable of being inserted into the narrow annular passage 159. Additionally, the rotation deflector 161 is superior in separation efficiency providing less of a possibility of blockage. This fact eliminates the need for a large filter resulting in a more compact design.

The steam or gas which enters the inlet 135 will pass through the annular space 159 and through the screen 153. If the solid matter is large enough not to pass the drain valve orifice 177, then it will be restricted by the screen 153.

As previously stated, steam or gas entering the annular space will have imparted thereto a rotational motion by the deflector 161 and water and foreign matter will be driven outwardly and will impinge on the inner wall of the sump case body 115 and will fall downwardly along the wall. The steam or gas will pass through the bottom opening of the swisher member 151 and through passage 155 of the retainer member 149 and will reach the chamber below the valve orifice 141. Water accumulated in the sump 113 will be discharged automatically through the drain valve orifice 177 to the drain outlet 179 by operation of the float 163.

At that time, the float 163 will not be disturbed because the rotation of gas is prevented from reaching the float by the float cover 165 and the rotation of water is restricted by the baffle plates 173. Additionally, since gas intensively rotates because of almost no obstruction, water particles and foreign matter can be effectively separated.

Separated water particles and foreign matter will float down quickly and, therefore, the water particles cannot be induced toward the outlet even if a large quantity of water flows into the sump.

The drain valve, including the float 163 and the float cover 165, can be integrated into the overall mechanism without attenuating the rotational motion of the gas because it is located at the bottom center of the sump 113.

Figure 4:
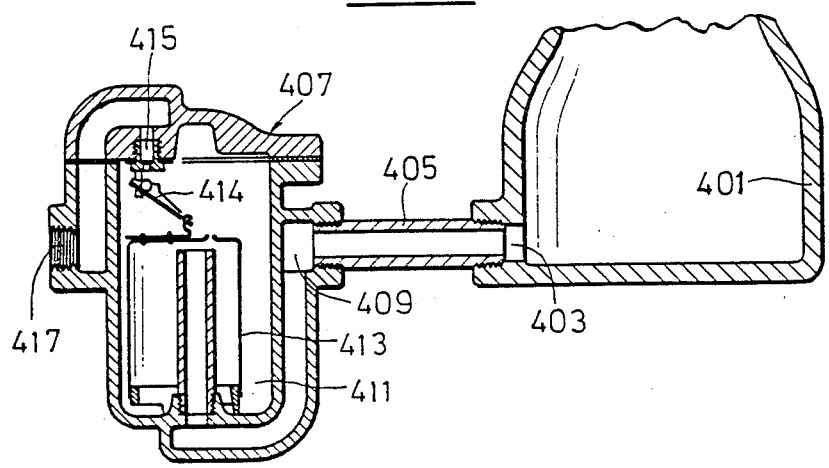
FIG. 4 is a sectional view showing the arrangement of a bucket-type steam trap which may operate to serve as a drain valve in the assembly of the invention.

As shown in the embodiment of FIG. 1, the drain valve can be integrated into the sump. However, as shown in the embodiment of FIG. 4, the drain valve can also be arranged outside of the sump body. If the quantity of water is small, a manual valve may be sufficient for the purpose.

Figure 7:
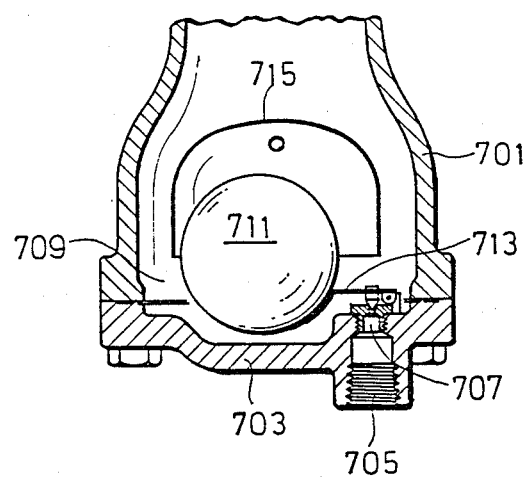
FIG. 7 is a sectional view of an arrangement of a float-type trap with a lever operative to serve as a drain valve.

Float valves are suitable for the drain valve and a float valve where a spherical float directly opens and closes the drain orifice as shown in FIG. 1 is especially suitable. However, as shown in the embodiment of FIG. 7, a float valve with a lever may also be used, as will be explained more fully hereinafter. With reference to the embodiment shown in FIG. 7, explanation or description of the upper part of the sump case body 701 is omitted because it is assumed as being the same as the upper part of the sump body 115 shown in FIG. 1.

With further reference to FIG. 7, there is shown a drain outlet 705 having at the inner end thereof a valve seat member which is fitted to form a drain valve orifice 707. A float 711 is arranged in a sump chamber 709 with the float being fixed to a lever 713 which is allowed to swing freely about a fulcrum provided near the drain valve orifice 707. A valve body is fitted to the lever 713 in order to open and close the drain valve orifice 707. A float cover 715 is arranged to cover the float 711 in a manner similar to that indicated in FIG. 1.

If the level in the sump 709 rises, the float 711 also rises and actuates the valve body to open the drain valve orifice 707. If the level in the sump 709 falls, the float also falls to close the drain valve orifice 707.

In applications of the present invention involving examples of drain valves for steam reducing valves, when installing a reducing valve in steam piping, not only the float valve as shown in FIG. 1 may be used, but also, other types of steam traps. Several examples of such steam traps are shown in FIGS. 4–6.

FIG. 4 shows an example where a bucket-type steam trap is arranged. A drain 403 is provided at the bottom circumference of a sump case 401 and connected to the inlet 409 of a bucket-type steam trap 407 by piping 405, the upper part of which is the same as in FIG. 1 and is therefore omitted. This steam trap has an inverted bucket in the water accumulated in a valve chamber 411 and steam or condensate at the inlet 409 will be directed into the bucket 413. The bucket 413 floats if steam enters and sinks if condensate enters. The bucket actuates the valve body by means of the lever 414 to open or close the drain orifice 415 and to automatically discharge condensate from the valve chamber 411 to the outlet 417.

Figure 5:
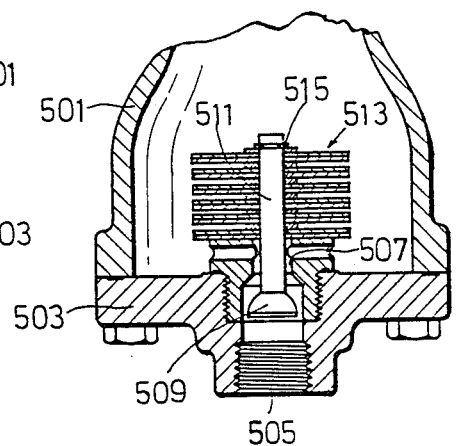
FIG. 5 is a sectional view of an arrangement of a bimetallic steam trap adapted to serve as a drain valve.

FIG. 5 shows another example, wherein a bimetallic steam trap is utilized. The upper part of the sump case body 501 is the same as that shown in FIG. 1 and is therefore omitted. A drain outlet 505 is provided at the center of the bottom cover 503 and a valve seat member is fitted to the inner end of the drain outlet to form a drain valve orifice 507. A valve spindle 511 provided with a drain valve body 509 at its bottom end is inserted through the valve orifice 507. A set of bimetals 513 is arranged surrounding the valve spindle 511 between the valve seat member and a snap ring 515 provided at the top of the valve spindle 511.

The bimetal set 513 flexes in accordance with the temperature of the surrounding liquid and is expanded in the direction of the valve spindle with higher temperature and contracted with lower temperature. As a result, the valve orifice will be closed to steam and opened to condensate.

In the present invention, other types of steam traps in addition to bimetallic steam traps may be utilized. For example, other thermostatic steam traps utilizing thermal expansion of liquids or wax are suitable for draining condensate at startup.

FIG. 6 shows a further example, wherein a disc-type steam trap is used. The upper part of the sump case body 601 is the same as that shown in FIG. 1 and is therefore again omitted from the drawing. A drain outlet 605 is provided at the center of the bottom cover 603 and a valve seat member 607 is fitted to the inner end of the drain outlet. The top of the valve seat member 607 constitutes two concentric protrusions serving as valve seats.

A valve body 609 in the form of a disc is placed on the valve seat and is covered with a cap 611. A vertical hole 613 at the center communicates with a sump chamber 617 by a horizontal hole 615 drilled in the valve seat member 607. An annular groove produced between th two protrusions at the top of the valve seat member 607 communicates with the drain outlet 605 by holes 619.

On the underside surface of the valve body 609, the pressure in the sum chamber is exerted at the central portion and the pressure in the drain outlet at the peripheral portion. On the upper surface of the valve body, pressure in a control chamber 621 is exerted and the pressure in the control chamber is the pressure of the steam enclosed therein. If the control chamber is surrounded by steam, steam in the control chamber will not condensate and, therefore, the pressure therein will not decrease. If the control chamber is surrounded by condensate, then steam condenses and the pressure decreases. As a result, the valve body 609 will be lifted off the valve seat to automatically discharge condensate. This trap is compact in size and durable against water hammer.

Thus, from the foregoing, it will be seen that the present invention operates to provide a reducing valve, wherein there is incorporated a vapor-liquid separator. The invention enables a strainer to be incorporated, if required, and eliminates the need for a large filter. The reducing valve of the invention is only slightly larger in size than an ordinary simple reducing valve because of the provision of the sump. As compared with prior types of vapor-liquid separators, strainers and reducing valves, the reducing valve in accordance with the invention occupies a length of pipe as short as that of simple prior art reducing valves and, therefore, may be installed with simple piping at very low cost. With the reducing valve in accordance with the present invention, since moisture is separated right before the valve orifice, steam containing almost no moisture may be supplied to the steam utilizing equipment, thereby improving its thermal efficiency.

Additionally, steam will not be wasted due to radiation at the vapor-liquid separator and strainer as in the case of prior art arrangements.

Thus, the invention is directed toward providing several important features and aspects.

First, the present invention is aimed toward providing a reducing valve assembly with a vapor-liquid separator, wherein the portion of the reducing valve casing surrounding the orifice is extended downwardly to form a sup below the orifice.

Secondly, the invention provides an annular partition at the upper portion of the sump to form an annular space between the partition and the valve casing.

A third important feature of the invention involves the fact that the invention allows the annular space to communicate with the valve inlet at the top thereof and with the sump at the bottom thereof and allows the space below the valve orifice to communicate with the sump by the bottom opening of th annular partition.

A fourth important feature of the invention is the provision of a deflector in the annular space in order to provide rotational motion to the gas and a fifth important aspect is the provision of a valve to discharge liquids collected in the sump.

As indicated in the foregoing disclosure, the important features of the invention include the provision of the drain valve at the bottom center of the sump chamber and the provision of a baffle plate placed in the direction across the rotational flow of liquid at the bottom of the sump chamber.

A float valve may be provided as the drain valve and a steam trap may also be provided as the drain valve.

While specific embodiments of the invention have been shown and described in detail to illustrate the application of the inventive principles, it will be understood that the invention may be embodied otherwise without departing from such principles.

What is claimed is:

1. A reducing valve assembly for steam including vapor-liquid separator means comprising:

a valve casing having contained therein reducing valve means comprising an orifice;

inlet and outlet means having said reducing valve means operatively interposed therebetween;

a sump chamber defined below said orifice by an extended portion of said valve casing below said reducing valve means, said extended portion extending from a part of said valve casing surrounding said orifice;

an annular partition at the upper part of said sump chamber forming an annular space between said partition and said extended portion of said valve casing;

said annular space being arranged to communicate with said inlet means from above and with said sump chamber from below;

said annular partition being configured to define a central passage in flow communication between said sump chamber and a space below said valve orifice;

rotation deflector means arranged in said annular space for imparting rotational motion to fluid entering said annular space from said inlet means; and float valve means arranged in said sump chamber to discharge liquid accumulated therein, said float valve means comprising a valve float for opening and closing said float valve means in accordance with a liquid level in said sump chamber and a float cover shaped in the form of an inverted cup having a vent hole in an upper part thereof and arranged so as to leave a gap between a lower part thereof and a bottom of said sump chamber, said float cover having said valve float contained therein and being so arranged that said lower part thereof is submerged in liquid accumulated in said sump chamber, said float cover having a pair of spaced apart vertically extending planar portions on opposite sides of said float for guiding the displacement of said float for opening and closing said float valve means, said float valve means including a drain orifice extending obliquely below said float cover, said drain orifice being positioned so that upon displacement of said float to close said float valve means, said float pivots into a position closing said drain orifice.

2. An assembly according to claim 1, wherein said float cover is located at the bottom center of said sump chamber.

3. An assembly according to claim 1, wherein there is provided a conical wall member extending upwardly from said annular partition between said annular partition and said valve orifice.

4. An assembly according to claim 3, wherein a perforated screen is provided outside of said conical wall member and wherein said inlet means is arranged to direct inlet flow toward the outer periphery of said conical wall member and through said perforated screen.

5. An assembly according to claim 4, wherein fluid flowing through said inlet means and through said perforated screen flows past the exterior of said annular partition into said annular space, with gaseous flow being directed upwardly through the interior of said annular partition.

* * * * *